United States Patent [19]
Gomez et al.

[11] Patent Number: 5,162,139
[45] Date of Patent: Nov. 10, 1992

[54] VEHICULAR PROTECTIVE STRIP

[76] Inventors: Michael Gomez, 1440 Columbine St., Apt. 2, Denver, Colo. 80206-2211; David M. Hayhurst, 1160 York St., Denver, Colo. 80206

[21] Appl. No.: 699,519

[22] Filed: May 14, 1991

[51] Int. Cl.⁵ .................... B60R 13/04; F16B 47/00
[52] U.S. Cl. .................... 428/31; 248/206.3; 280/770; 293/128
[58] Field of Search .............. 428/31; 280/770; 293/128; 248/206.3

[56] References Cited

U.S. PATENT DOCUMENTS

| | | | |
|---|---|---|---|
| 2,734,765 | 2/1956 | Henderson et al. | 428/31 X |
| 3,582,134 | 6/1971 | Schaff | 293/128 X |
| 4,498,697 | 2/1985 | McGlone et al. | 293/128 |
| 4,707,008 | 11/1987 | Falco | 428/31 X |
| 4,808,451 | 2/1989 | McCue et al. | 428/31 |
| 4,828,303 | 5/1989 | Soria | 293/128 |

*Primary Examiner*—Henry F. Epstein
*Attorney, Agent, or Firm*—Leon Gilden

[57] ABSTRACT

A plurality of strips are interconnected for a locking communication relative to one another in a longitudinal orientation relative to a forward panel, door panel, and rear panel of an associated vehicle on each side of the vehicle to include a central flexible flange mounting a removable "C" shaped covering thereover. Forward and rear strip members each include pivotally mounted "U" shaped flanges for positioning in locking communication with the fender well portion of the vehicle to fixedly secure the strip structure to the vehicle. The strips include locking end portions for maintaining the strips in aligned orientation.

1 Claim, 5 Drawing Sheets

PRIOR ART

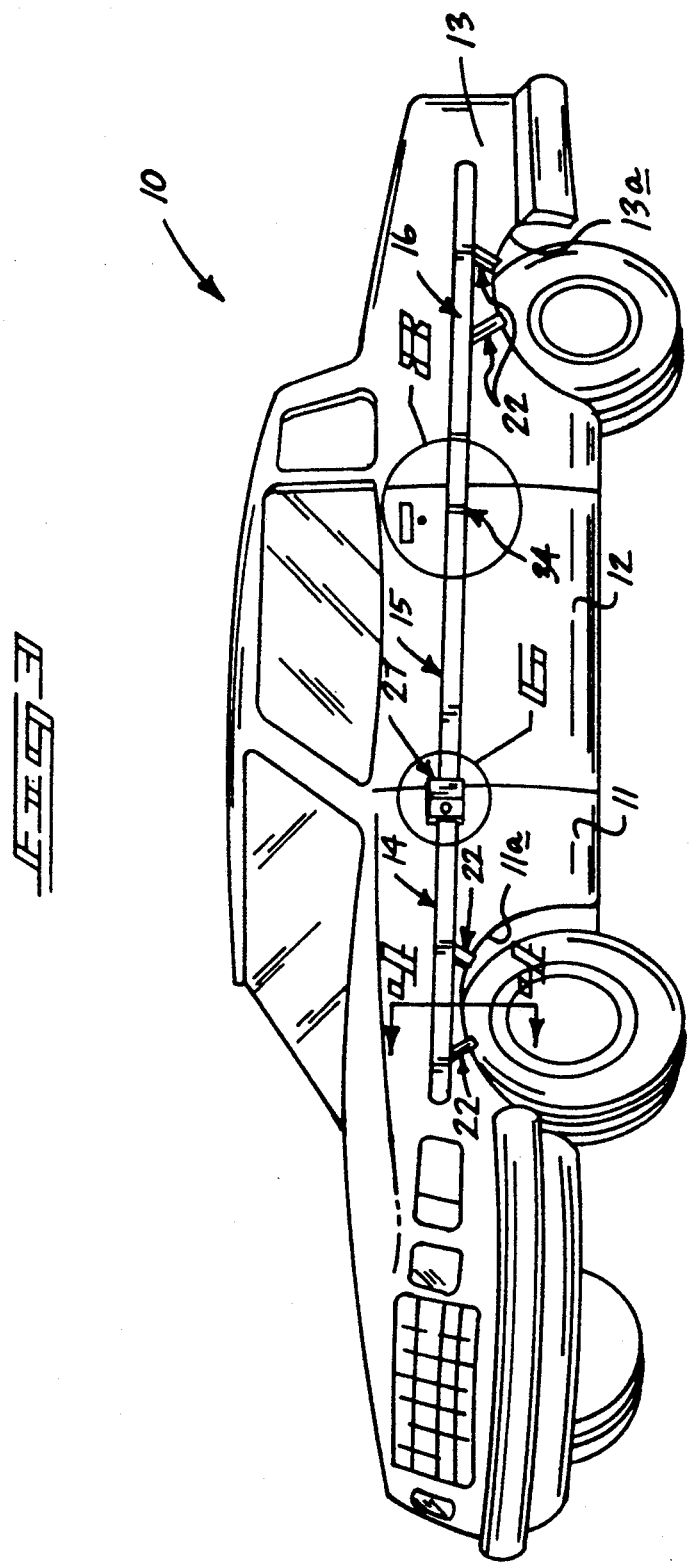

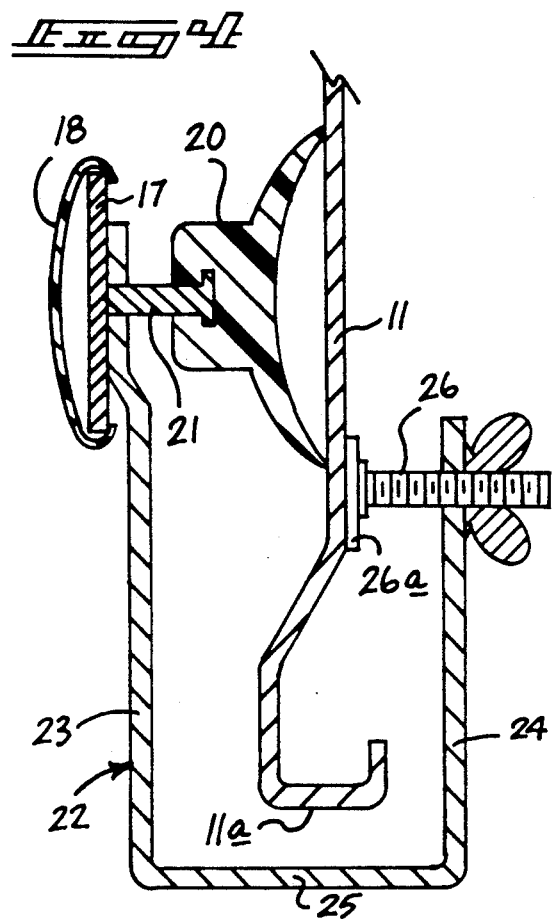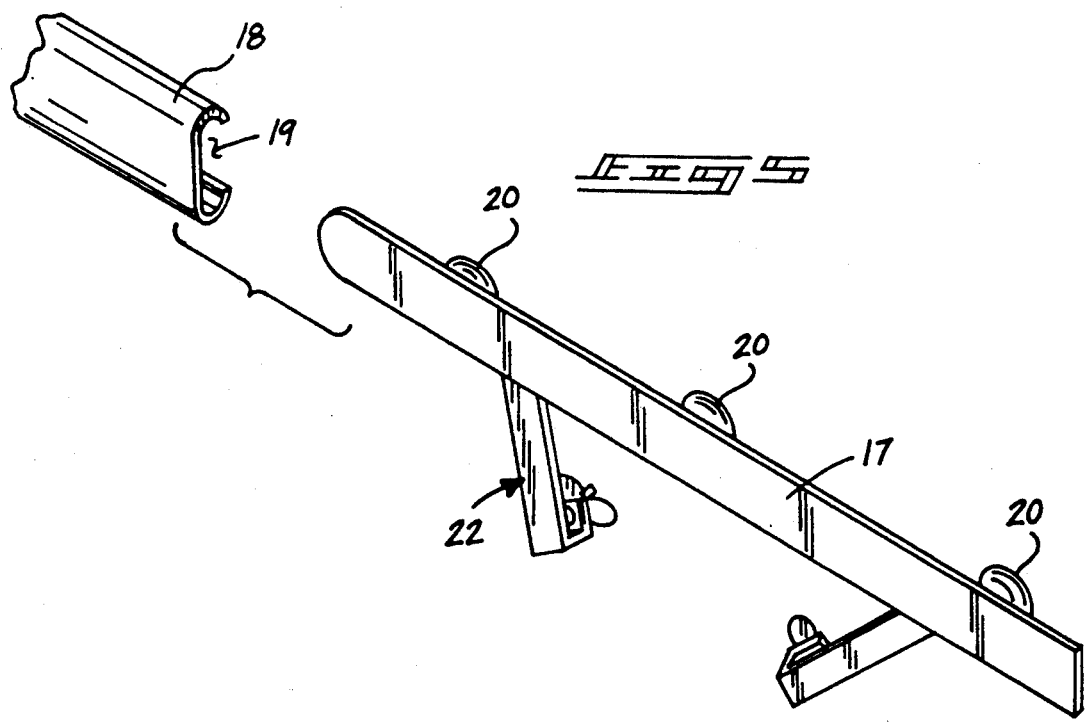

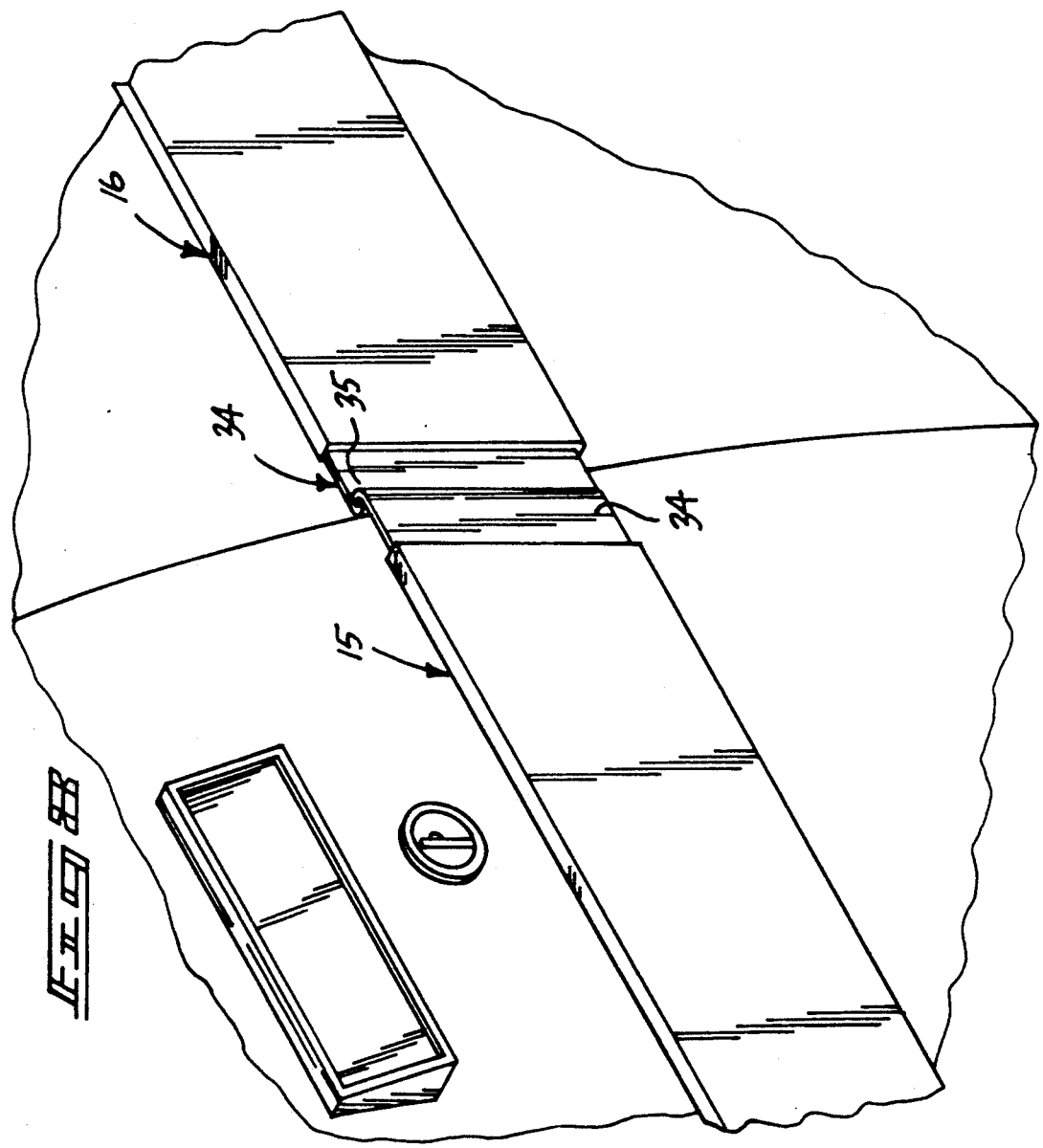

VEHICULAR PROTECTIVE STRIP

BACKGROUND OF THE INVENTION

1. Field of the Invention

The field of invention relates to protective strip structure for vehicles, and particularly pertains to a new and improved vehicular protective strip apparatus wherein the same is arranged for selective locking to a motor vehicle.

2. Description of the Prior Art

Vehicles are subject to damage due to inadvertent impact in parking lot situations and the like, wherein the instant invention is arranged to provide a selectively securable locking strip structure to prevent such unnecessary and avoidable damage resulting in associated economic loss of time and material.

Prior art structure has been utilized to permit securement of protective strips to side panels of a vehicle and are exemplified in U.S. Pat. No. 4,498,697 to McGlone, et al. utilizing magnetic strips arranged for positioning to a metallic vehicular body structure.

U.S. Pat. No. 3,582,134 to Shaff utilizes strip members of resilient material including magnets for securement of the material to the vehicular body.

U.S. Pat. No. 4,707,008 to Falco sets forth a locking body molding structure utilizing suction cup members for adherence of the organization to a body of a vehicle.

U.S. Pat. No. 2,734,765 to Henderson, et al. sets forth a protective strip with further examples of suction cups for securement of the strip to an associated vehicular body.

As such, it may be appreciated that there continues to be a need for a new and improved vehicular protective strip apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of vehicular protective strip structure now present in the prior art, the present invention provides a vehicular protective strip apparatus wherein the same utilizes interlocking strip members for providing a continuous locking strip structure relative to a side of an associated motor vehicle. As such, the general purpose of the present invention, which will be described subsequently in greater detail, is to provide a new and improved vehicular protective strip apparatus which has all the advantages of the prior art protective strip structure for self-propelled vehicles and none of the disadvantages.

To attain this, the present invention provides a plurality of strips interconnected for a locking communication relative to one another in a longitudinal orientation relative to a forward panel, door panel, and rear panel of an associated vehicle on each side of the vehicle to include a central flexible flange mounting a removable "C" shaped covering thereover. Forward and rear strip members each include pivotally mounted "U" shaped flanges for positioning of the vehicle to fixedly secure the strip structure to the vehicle. The strips include locking end portions for maintaining the strips in aligned orientation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will apreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular protective strip apparatus which has all the advantages of the prior art vehicular protective strip apparatus and none of the disadvantages.

It is another object of the present invention to provide a new and improved vehicular protective strip apparatus which may be easily and efficiently manufactured and marketed.

It is a further object of the present invention to provide a new and improved vehicular protective strip apparatus which is of a durable and reliable construction.

An even further object of the present invention is to provide a new and improved vehicular protective strip apparatus which is susceptible of a low cost of manufacture with regard to both materials and labor, and which accordingly is then susceptible of low prices of sale to the consuming public, thereby making such vehicular protective strip apparatus economically available to the buying public.

Still yet another object of the present invention is to provide a new and improved vehicular protective strip apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an orthographic cross-sectional illustration of the invention, taken along the lines 4—4 of FIG. 3 in the direction indicated by the arrows.

FIG. 5 is an isometric exploded illustration of the wheel well locking structure utilized by the instant invention.

FIG. 8 is an isometric illustration of the interlocking structure of the strip structure as set forth in Section 8 of FIG. 3.

DESCRIPTION OF THE PREFERRED EMBODIMENT

Figure 1:
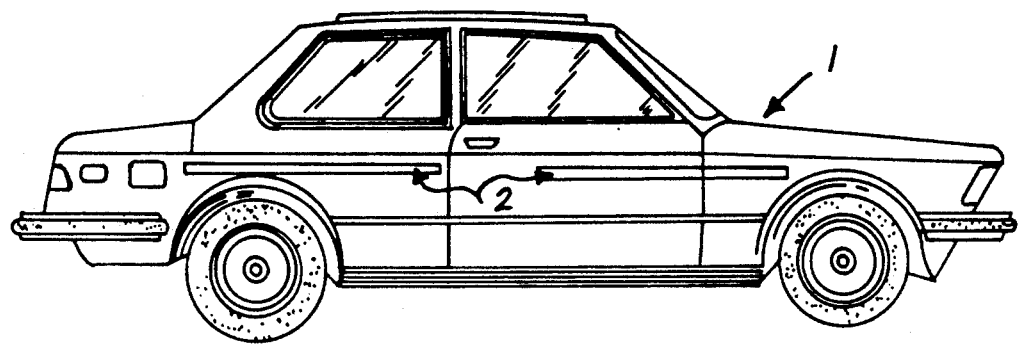
FIG. 1 is an orthographic side view of a prior art protective strip apparatus.
Figure 2:
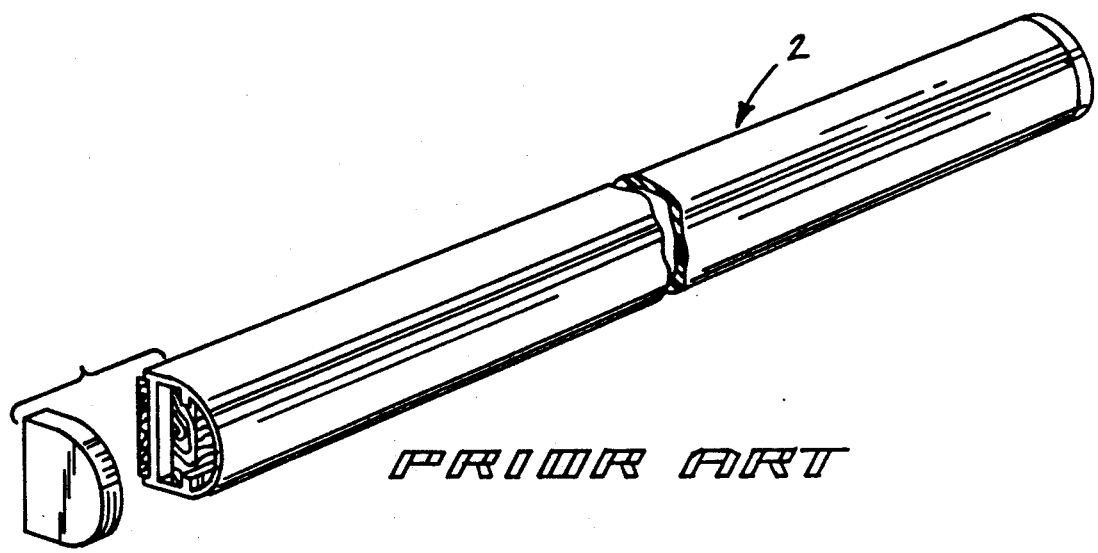
FIG. 2 is an isometric illustration of the strip apparatus as set forth in FIG. 1 in an enlarged configuration.

With reference now to the drawings, and in particular to FIGS. 1 to 8 thereof, a new and improved vehicular protective strip apparatus embodying the principles and concepts of the present invention and generally designated by the reference numeral 10 will be described.

FIG. 1 illustrates a prior art protective strip structure 1 in association with a vehicle, wherein a plurality of the strips 2 utilize a magnetic base to secure the strip structure to the side panels of the associated vehicle.

Figure 6:
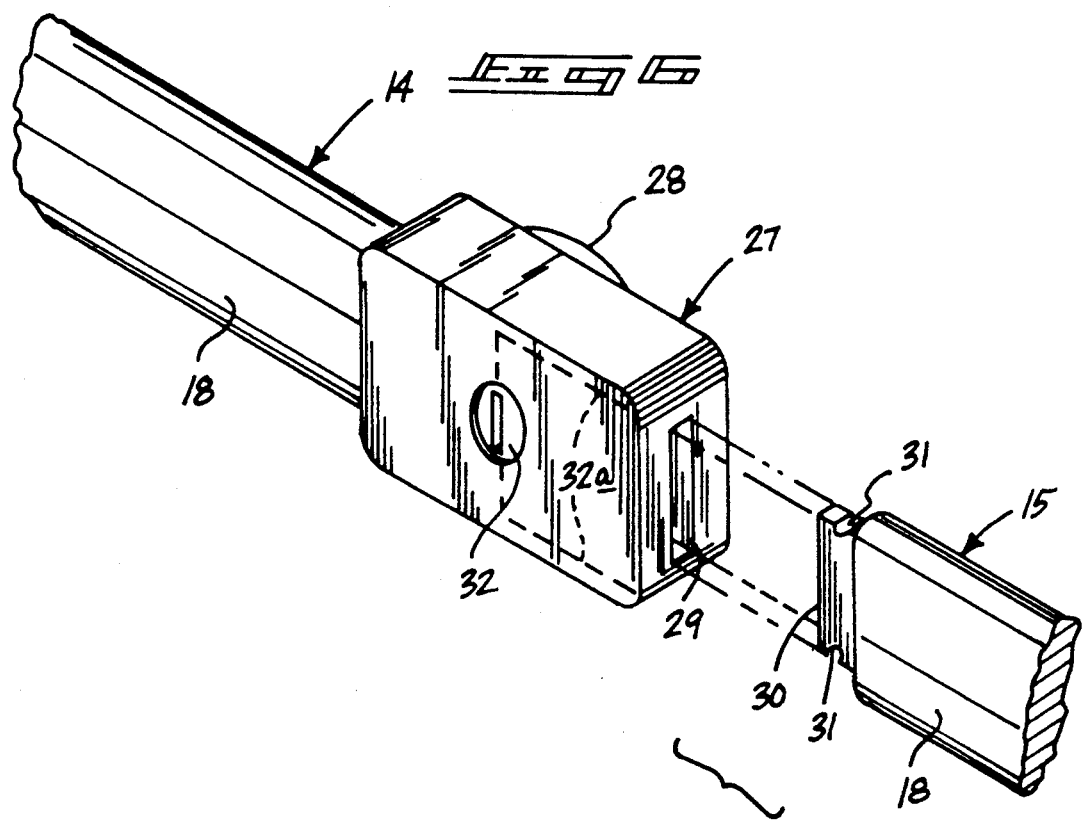
FIG. 6 is an isometric illustration of the locking structure as set forth in Section 6 of FIG. 3.
Figure 7:
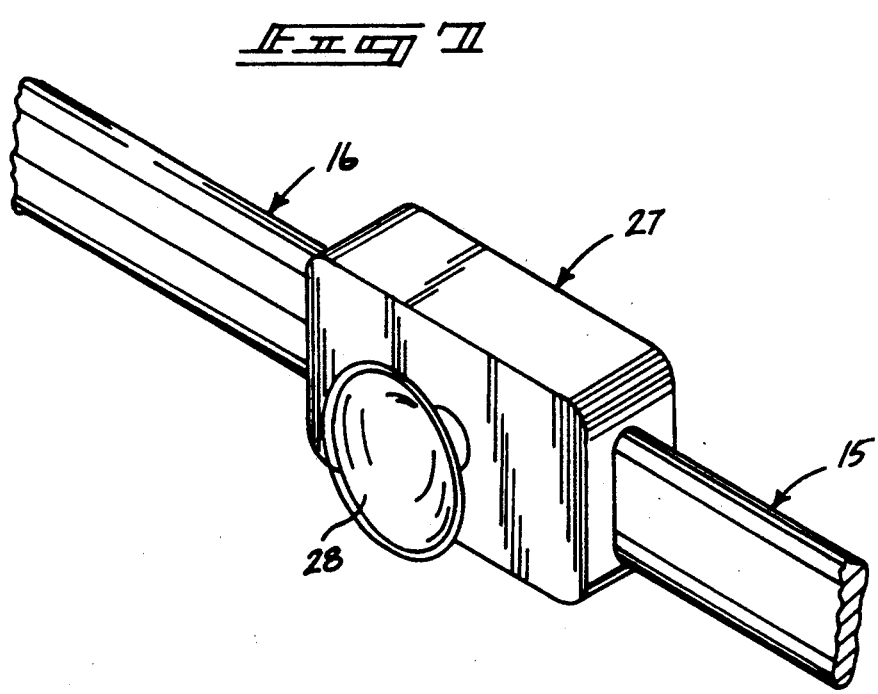
FIG. 7 is a rear isometric illustration of the locking structure as set forth in FIG. 6.

More specifically, the vehicular protective strip apparatus 10 of the instant invention essentially comprises the apparatus mounted to a self-propelled vehicle at each side thereof. The vehicle is illustrated for illustrative purposes depicting the left side thereof, where it is understood that the right side is merely a mirror image construction of the left side, as illustrated. The vehicle is depicted with a front fender panel 11 aligned with at least one door panel 12, in turn aligned with a rear fender panel 13. The front and rear fender panels 11 and 13 include respective forward and rear wheel well flanges 11a and 13a accommodating each forward and rear wheel of the side as illustrated. The apparatus 10 includes a forward protective strip 14 longitudinally aligned with a door panel strip 15, in turn longitudinally aligned with a rear panel strip 16. Each of the strips are defined as protective strips and include an elongate flexible support flange 17 of a predetermined width and a predetermined length coextensive with each of the strips 14 through 16. Each flange 17 slidably receives a resilient sleeve 18 thereon of a generally "C" shaped cross-sectional configuration, whose construction includes a groove 19 coextensive with the sleeve, wherein the sleeve is defined by a length equal to the predetermined length and a width equal to the predetermined width to slidably receive the support flange 17 thereon. In turn, each of the strips 14-16 includes a coextensive resilient sleeve 18, as illustrated. First suction cup members 20, each mounted on a suction cup axle 21 that is orthogonally and fixedly mounted to a rear surface of the flange 17. A plurality of the axles 21 in a spaced relationship, each pivotally mount a "U" shaped flange 22 thereon. The "U" shaped flange includes a first leg 23 defined by a first length directed downwardly from the flange 17, with a second leg 24 defined by a second length less than the first length defined by the first leg 23 and arranged parallel relative to the first leg, with a connecting web 25 orthogonally securing lower terminal ends of the first and second legs 23 and 24 together, in a manner as illustrated in FIG. 4. The second leg 24 includes a lock rod 26 orthogonally directed through the second leg 24 adjacent an upper terminal end thereof that includes a foot plate 26a for spreading load against an interior surface of an associated fender panel 11. Each "U" shaped flange of the plurality of "U" shaped flanges receives an associated wheel well flange of the forward and rear flanges 13a and 11a between the first and second legs, as illustrated in FIG. 4. This permits universal securement of the forward and rear strips 14 and 16 relative to the front and rear fender panels 11 and 13. Securement of the forward protective strip 14 to the door panel strip 15 is accommodated through a lock housing 27. The lock housing 27 is fixedly mounted to a rear terminal end of the forward protective strip 14 and receives a forward terminal end of the door panel strip 15 thereon. The second suction cup member 28 is mounted to a rear surface of the lock housing 27. A locking slot 29 is longitudinally aligned with the lock housing 27 and the forward protective strip 14 and the door panel protective strip 15. A locking flange 30 formed to a forward terminal end of the forward flange 17 of the door panel strip 15 includes a plurality of locking flange recesses 31 formed to upper and lower edges of the locking flange 30 to be received within the locking slot 29, whereupon a rotary locking member 32 effects reciprocation of a rotary locking bolt member 33. It should be understood that in the event of a plurality of doors, a further lock housing of a type as illustrated in FIG. 6 is provided to duplicate the locking structure on the exterior surface of each door. The door and rear strips 15 and 16 are secured together by interengaging respective first and second "L" shaped flanges 34 and 35, with the rear panel protective strip 16 including the flange structure 22, as described in FIG. 4 and as illustrated in FIG. 3 for example.

Accordingly, the mounting of the protective strip structure to an exterior surface longitudinally of the vehicle is provided and it is believed that the above permits one of ordinary skill in the art to duplicate and use the same.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. A vehicular protective strip structure for securement to a vehicle, wherein the vehicle includes a front fender panel, at least one door panel, and a rear fender panel, and the front fender panel includes a forward wheel well flange and the rear fender panel includes a rear wheel well flange, and wherein the structure comprises, a forward protective strip secured to the front fender panel, a door panel protective strip secured to the door panel, and a rear panel protective strip secured to the rear fender panel, each protective strip includes an elongate flexible support flange, and each support flange defined by a predetermined width and a predetermined length, and a resilient sleeve defined by a "C" shaped cross-sectional configuration, including a width equal to that which slidably receivers the support flange therewithin, and first securement means mounted to the forward protective strip for securement to the front fender panel, and second securement means mounted to the door panel protective strip for securement of the door panel protective strip to the door panel, and third securement means mounted to the rear panel protective strip for securement of the rear panel protective strip to the rear fender panel, and the first securement means and the third securements means each include a plurality of first suction cup members mounted to a rear surface of the support flange, and each of the first suction cup members including a suction cup axle orthogonally mounted to the rear surface of the support flange, and a plurality of the suction cup axles including a "U" shaped flange pivotally mounted to the said plurality of suction cup axles, and each "U" shaped flange including a first leg pivotally mounted to the suction cup axle defined by a first length, and a second leg spaced from and parallel the first leg defined by a second length less than the first length, and a connecting web orthogonally connected to a lower terminal end of the first leg and a further lower terminal end of the second leg, wherein the second leg includes an externally threaded lock rod threadedly and orthogonally directed through the second leg, with the lock rod including a foot plate, wherein the foot plate is arranged for securement of a fender panel between the foot plate and the first leg, and the second securement means includes a lock housing fixedly mounted to a rear terminal end of the forward protective strip and further includes a locking flange mounted to a forward terminal end of the door panel protective strip, wherein the lock housing includes a locking slot, the locking slot longitudinally aligned with the forward protective strip and the door panel protective strip and arranged for complementarily receiving the locking flange therewithin, and the second securement means further includes a first "L" shaped flange mounted to a rear terminal end of the door panel protective strip, and a second "L" shaped flange inter-engaging the first "L" shaped flange, with the second "L" shaped flange fixedly mounted to a forward terminal end of the rear panel protective strip.

* * * * *